United States Patent
Wilson et al.

(10) Patent No.: US 11,253,092 B1
(45) Date of Patent: Feb. 22, 2022

(54) SANITARY UTENSIL HOLDING AND SERVING SYSTEM

(71) Applicants: Roslyn Denise Wilson, Suffolk, VA (US); John Eldridge Childress, Suffolk, VA (US)

(72) Inventors: Roslyn Denise Wilson, Suffolk, VA (US); John Eldridge Childress, Suffolk, VA (US)

( * ) Notice: Subject to any disclaimer, the term of this patent is extended or adjusted under 35 U.S.C. 154(b) by 0 days.

(21) Appl. No.: 17/076,483

(22) Filed: Oct. 21, 2020

Related U.S. Application Data

(60) Provisional application No. 63/101,889, filed on May 21, 2020, provisional application No. 63/100,645, filed on Mar. 23, 2020, provisional application No. 63/101,659, filed on Feb. 20, 2020, provisional application No. 62/974,269, filed on Jan. 23, 2020.

(51) Int. Cl.
*A47G 21/14* (2006.01)
*F16M 11/04* (2006.01)

(52) U.S. Cl.
CPC .......... *A47G 21/145* (2013.01); *F16M 11/041* (2013.01)

(58) Field of Classification Search
CPC .............................. A47G 21/14; A47G 21/145
USPC ........... 248/316.7, 309.1, 346.03, 74.2, 37.3, 248/37.6; 211/70.7, 88.01, 89.01
See application file for complete search history.

(56) References Cited

U.S. PATENT DOCUMENTS

| | | | |
|---|---|---|---|
| 1,323,838 A | 12/1919 | Copp | |
| 1,393,574 A | 10/1921 | Rohmiller | |
| 2,590,286 A | 3/1952 | Wirtanen et al. | |
| 2,739,465 A * | 3/1956 | Soderblom | A47G 21/145 248/37.6 |
| 3,163,385 A * | 12/1964 | Lazan, Jr. | A47J 47/16 248/37.6 |
| 5,479,708 A * | 1/1996 | Thomas | A47G 21/02 30/122 |
| 5,699,614 A * | 12/1997 | Garneau, Sr. | A47G 21/02 30/142 |
| 5,730,405 A * | 3/1998 | Nichols, IV | A47J 43/287 248/213.2 |
| 5,890,223 A * | 4/1999 | Klemmer | A47G 21/02 30/150 |

(Continued)

*Primary Examiner* — Nkeisha Smith
(74) *Attorney, Agent, or Firm* — Goldstein Law Offices, P.C.

(57) ABSTRACT

A utensil holding and serving system for use in buffet-style eating includes interchangeable serving utensils for serving and manipulating food, a handle for selectively engaging the serving utensils, and a stand for receiving and suspending the serving utensils over a food tray or surface. The serving utensils include a connecting shaft, a working portion including a functional member, such as a spoon, fork, or spatula, and a standing portion having support apertures. The handle includes a longitudinal bore for removably receiving the connecting shaft of one of the serving utensils, and a mounting member including arms having a tapered inner surface for receiving an edge of a plate. The stand includes a utensil suspending portion having pegs extending upwardly for selectively engaging the support apertures of one of the serving utensils to support said serving utensil upon the stand and a support portion for stabilizing the stand on a surface.

19 Claims, 6 Drawing Sheets

(56) References Cited

U.S. PATENT DOCUMENTS

| | | | | |
|---|---|---|---|---|
| 5,933,918 | A * | 8/1999 | Wallays | A47J 45/071 16/114.1 |
| 6,115,921 | A * | 9/2000 | Garneau, Sr. | B25G 3/24 30/123 |
| 6,412,398 | B1 * | 7/2002 | Norcross | A47J 43/283 294/55.5 |
| 6,591,739 | B2 * | 7/2003 | Norcross | A47J 43/283 294/55.5 |
| 6,675,483 | B2 | 1/2004 | Bond et al. | |
| 7,716,842 | B2 * | 5/2010 | Sumner-Trivisani | A47G 21/145 30/324 |
| 9,668,617 | B1 * | 6/2017 | Barnes | A47J 43/287 |
| 2005/0011367 | A1 | 1/2005 | Crow | |
| 2005/0194329 | A1 * | 9/2005 | Bolling | A47J 47/16 211/50 |
| 2006/0053638 | A1 * | 3/2006 | Sumner-Trivisani | A47G 21/02 30/298.4 |
| 2006/0175228 | A1 | 8/2006 | Howel et al. | |
| 2008/0289188 | A1 | 11/2008 | Holdbrooks | |
| 2009/0134055 | A1 * | 5/2009 | Spellman | A47G 21/10 206/553 |
| 2012/0152962 | A1 | 6/2012 | Arbuckle | |
| 2012/0159794 | A1 * | 6/2012 | Vogel | B25G 3/18 30/340 |
| 2015/0216364 | A1 | 8/2015 | Knight, Sr. | |
| 2019/0150673 | A1 | 5/2019 | Joe | |
| 2020/0016285 | A1 | 1/2020 | Newsome | |

* cited by examiner

SANITARY UTENSIL HOLDING AND SERVING SYSTEM

CROSS-REFERENCE TO RELATED APPLICATIONS

This application claims the benefit of priority of U.S. Provisional Patent Application Ser. No. 62/974,269, filed on Jan. 23, 2020, U.S. Provisional Patent Application Ser. No. 63/101,659, filed on Feb. 20, 2020, U.S. Provisional Patent Application Ser. No. 63/100,645, filed on Mar. 23, 2020, U.S. Provisional Patent Application Ser. No. 63/101,889, filed on May 21, 2020 the contents of which are relied upon and incorporated herein by reference in their entirety.

TECHNICAL FIELD

The present disclosure relates generally to serving utensils. More particularly, the present disclosure relates to a sanitary system for holding and serving food in public areas where diners are served themselves, such as buffets, banquets, and catered social events.

BACKGROUND

Spoons, ladles, tongs, forks, spatulas, and other serving utensils used for self-serving meals in the commercial food service or in social gatherings are often shared by the majority of people in these settings. Sharing utensils in such a regular and recurring manner creates unsanitary conditions, which increase the chance of contaminating the utensils and spreading germs across the utensils from person to person. Unfortunately, consumers are aware of the possibility of contamination of shared utensils and are genuinely concerned about picking up harmful germs, especially in light of the COVID-19 pandemic. Accordingly, consumers simply resolve to not dining in these sorts of commercial food service establishments or attending social gatherings including this type of meal style. And, if consumers do end up going to these establishments or participating in these gatherings, they simply refrain from eating or using the utensils provided.

Some in the food industry have made attempts to hinder the spread of germs by providing sanitizing utensil covers. The utensil covers have compartments that are configured to accept utensil handles and include ultraviolet lights and liquids for sanitizing the utensil handle while inside of the compartment. Though effective in curtailing the spread of germs, these covers are disadvantageous because they are generally cumbersome and expensive, thus they are not practical for consumers.

Accordingly, there is a need for a sanitary utensil serving and holding system that prevents the contamination of shared utensils and is relatively inexpensive.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a sanitary utensil holding and serving system that enables individuals serving themselves food in buffet-style eating in a commercial or social setting to share serving utensils without having to worry about picking up disease-causing germs spread on the utensils from other individuals. Accordingly, the present disclosure provides a system including a personal or individual-specific handle and a set of communal interchangeable serving utensils, each including a connecting shaft that is engageable by the handle. The handle includes a bore having a magnet therein that secures the connecting shaft within the bore so as to secure the handle to one of the serving utensils for use by an individual when serving himself/herself food with a serving utensil specific to a tray of food. The handle is removable from the connecting shaft for use on a different serving utensil that is directed to a separate tray of food. The handle further includes a mounting member having arms that are configured to engage/receive the edge of a plate such that a user may attach the handle to his/her plate when finished self-serving. In this way, the handle does not interfere with the user's holding and transportation of the plate when holding/carrying the plate back to a table.

Yet another aspect of an example embodiment in the present disclosure is to provide a sanitary utensil holding and serving system that includes a means for suspending the set of communal interchangeable serving utensils over a tray of food so as to facilitate engagement of the connecting shaft by the handle when self-serving and removal of the handle from the connecting shaft when finished self-serving. Accordingly, the sanitary utensil holding and serving system includes a stand having a food tray attachment mechanism for mounting the stand directly to a food tray or a food tray holder and a utensil suspending portion including pegs for receiving the serving utensils. The set of serving utensils each include support apertures corresponding to the pegs. To mount and suspend the serving utensil onto the utensil suspending portion, for example, when a user is finished self-serving a meal, the serving utensil is lowered vertically onto the utensil suspending portion such that the pegs engage the support apertures of said serving utensil. To remove the handle from the serving utensils, the user simply pulls the handle horizontally away from the connecting shaft. The pegs maintain the serving utensil in position on the utensil suspending portion by preventing horizontal movement of utensil about the utensil suspending portion. In this way, the handle may be removed while the serving utensil remains suspended over the food. To secure the handle to the serving utensil, the user simply slides the handle horizontally onto the connecting shaft via the bore until the magnet engages the connecting shaft. The pegs maintain the serving utensil in position, thereby allowing the handle to be attached to the serving utensil while suspended on the utensil suspending portion. To use the serving utensil, the user simply lifts the serving utensil vertically upwardly from the utensil suspending portion, disengaging the pegs from the support apertures and freeing the serving utensil for use.

Still another aspect of an example embodiment in the present disclosure is to provide a sanitary utensil holding and serving system that includes a support portion for stabilizing the stand in a free-standing position and a food catching plate for catching food or liquids falling from the serving utensil. Accordingly, in some embodiments of the present disclosure, the stand includes a planar base configured to support the stand in an upright position. The food catching plate is arranged and configured with respect to the utensil suspending portion such that the food catching plate is positioned below the functional members of the serving utensils when the serving utensils are mounted onto the utensil suspending portion.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
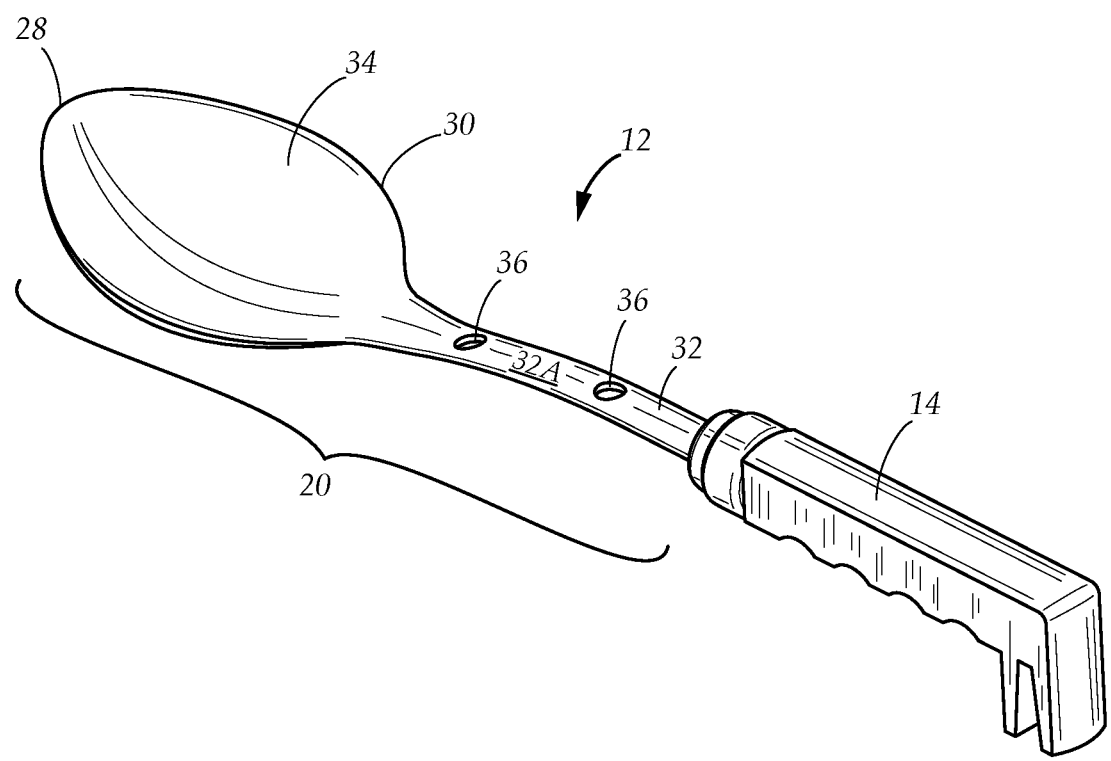
FIG. 1 is a perspective view of the handle of the sanitary utensil holding and serving system mounted onto one of the serving utensils of the sanitary utensil holding and serving system, illustrating one manner in which the handle mounts onto the serving utensils according to one embodiment of the present disclosure.
Figure 2:
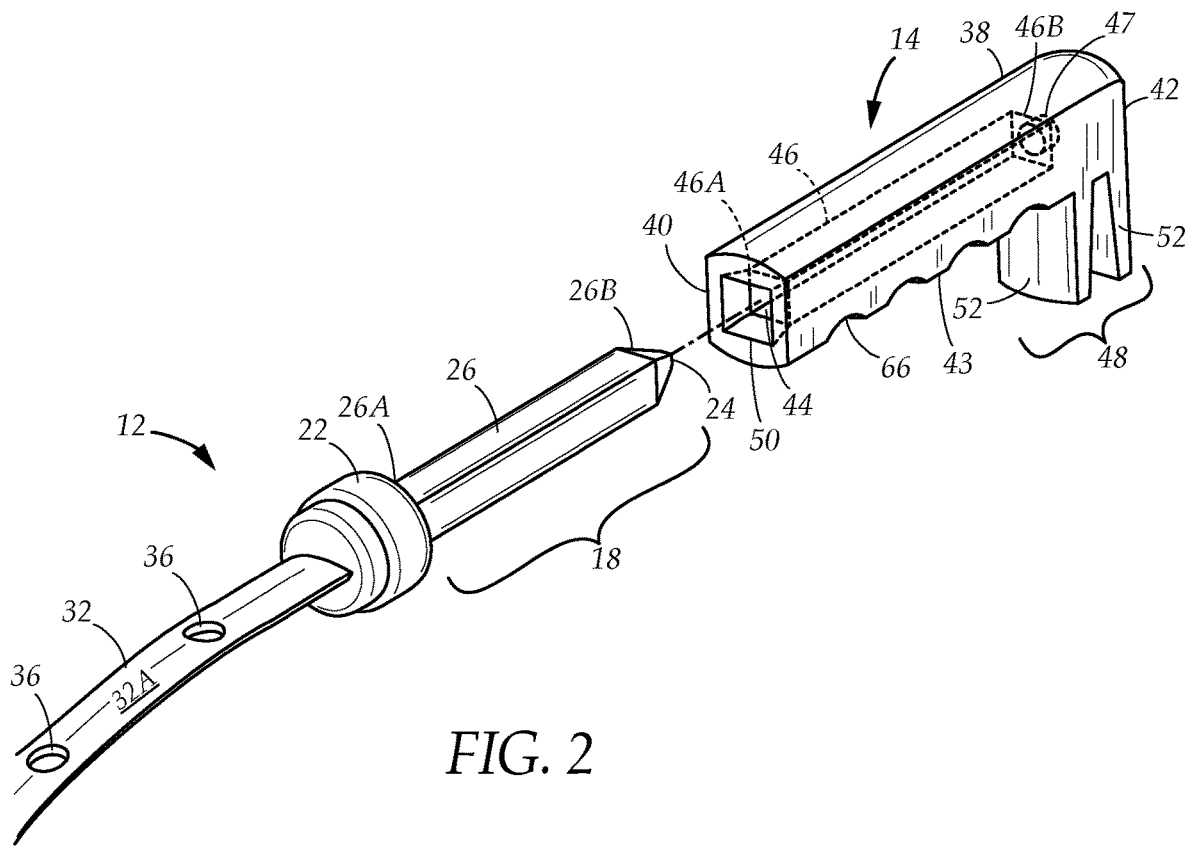
FIG. 2 is an exploded view of the handle of the sanitary utensil holding and serving system receiving the connecting shaft of one of the serving utensils of the sanitary utensil holding and serving system, illustrating one manner in which the longitudinal bore of the handle engages the connecting shaft to secure to said utensil according to one embodiment of the present disclosure.
Figure 4A:
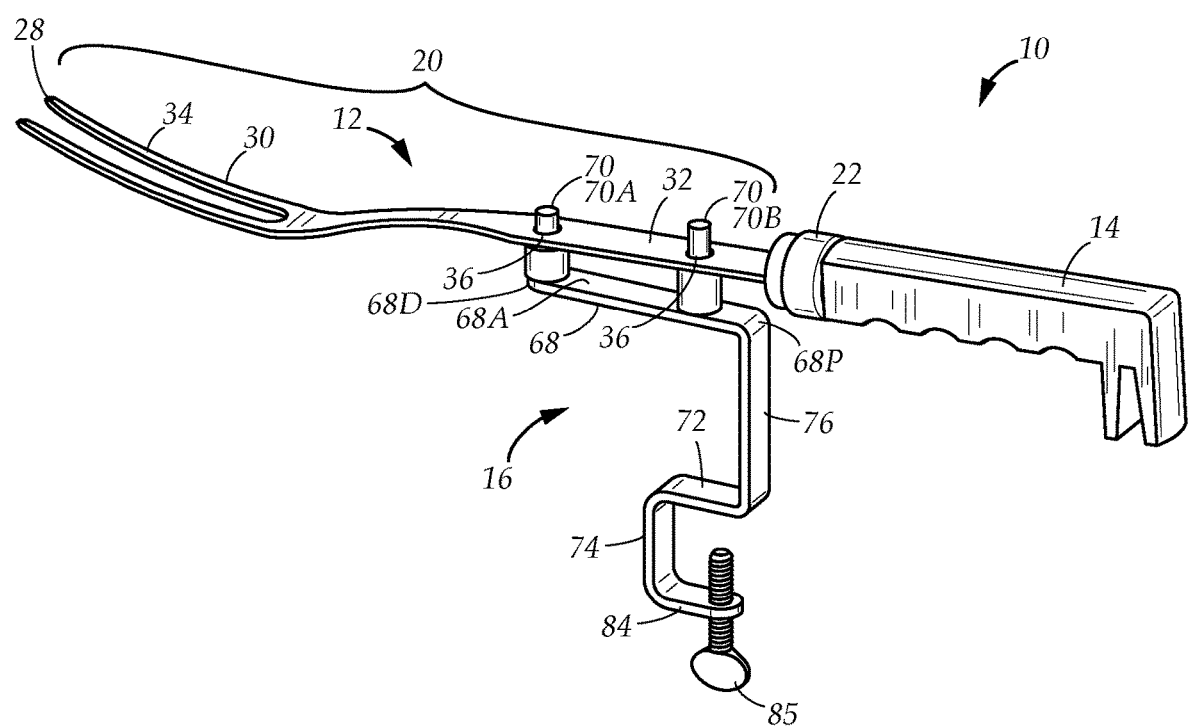
FIG. 4A is a perspective view of the stand of the sanitary utensil holding and serving system in its food tray attachment configuration, illustrating the configuration of the clamp of the stand and the pegs of the utensil suspending portion of the stand suspending a serving utensil according to one embodiment of the present disclosure.

FIG. 1, FIG. 2, and FIG. 4A illustrate a sanitary utensil holding and serving system 10 for use in buffet-style eating. Note, buffet-style eating is generally any type of eating in which users serve themselves their own meals from a publicly shared array of food trays and serving utensils. The sanitary utensil holding and serving system 10 includes a plurality of interchangeable serving utensils 12 for serving and manipulating food, a personal handle 14 for selectively engaging and disengaging the plurality of interchangeable serving utensils 12, and a stand 16 for removably receiving and suspending the plurality of interchangeable serving utensils 12 over a food tray or surface. Note, the handle 14 is personal in that the handle 14 is adapted for use across all of the plurality of interchangeable serving utensils 12 by a single individual.

Each of the plurality of interchangeable serving utensils 12 includes a first part 18 and a second part 20 separated by a collar 22. The first part 18 includes a first end 24 of the plurality of interchangeable serving utensils 12 and a connecting shaft 26 having a longitudinal length extending from the collar 22 to the first end 24. The connecting shaft 26 includes a first end 26A connected to the collar 22 and a free second end 26B including a magnetic material. In embodiments, a cross-section of the connecting shaft 26 is rectangular in shape and uniform along the longitudinal length of the connecting shaft 26.

The second part 20 includes a second end 28 of the plurality of interchangeable serving utensils 12, a working portion 30, and a standing portion 32 connected to the working portion 30. The working portion 30 extends from the standing portion 32 to the second end 28 and the standing portion 32 extends from the collar 22 to the working portion 30. The working portion 30 includes a functional member 34 for manipulating food. For example, the functional member 34 may include a spoon, a fork, a spatula, a ladle, a knife, or a tong. The standing portion 32 includes a top surface 32A, a bottom surface (not shown), and a pair of support apertures 36 that are spaced longitudinally on the standing portion 32 and that extend vertically between the top surface 32A and the bottom surface.

Figure 2A:
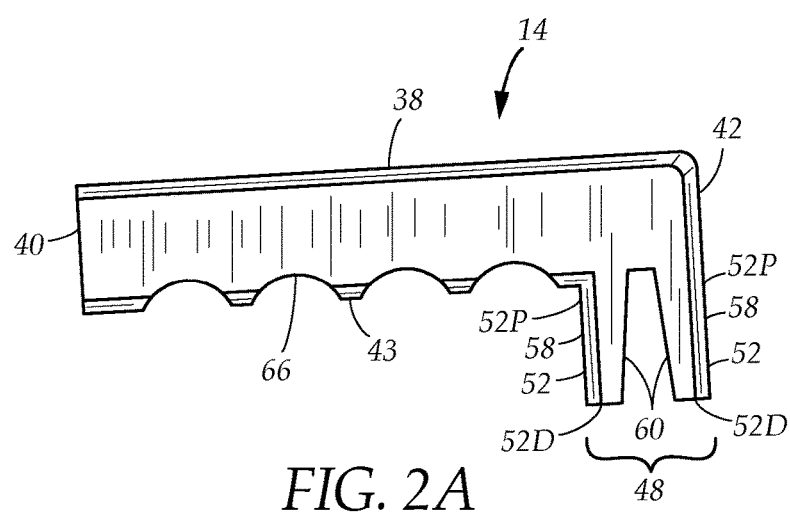
FIG. 2A is a side elevation view of the handle of the sanitary utensil holding and serving system, illustrating the configuration of the mounting member of the handle according to one embodiment of the present disclosure.
Figure 5A:
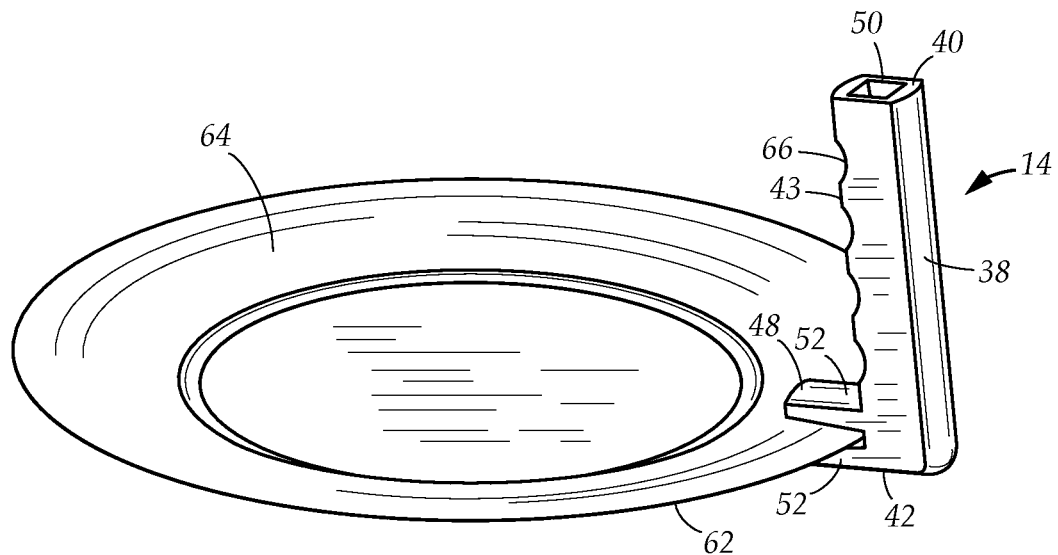
FIG. 5A is a perspective view of the handle of the sanitary utensil holding and serving system mounted onto a plate, illustrating one manner in which the arms of the mounting member of the handle engages/receives the edge of the plate therebetween to secure the handle on the plate according to one embodiment of the present disclosure.
Figure 5B:
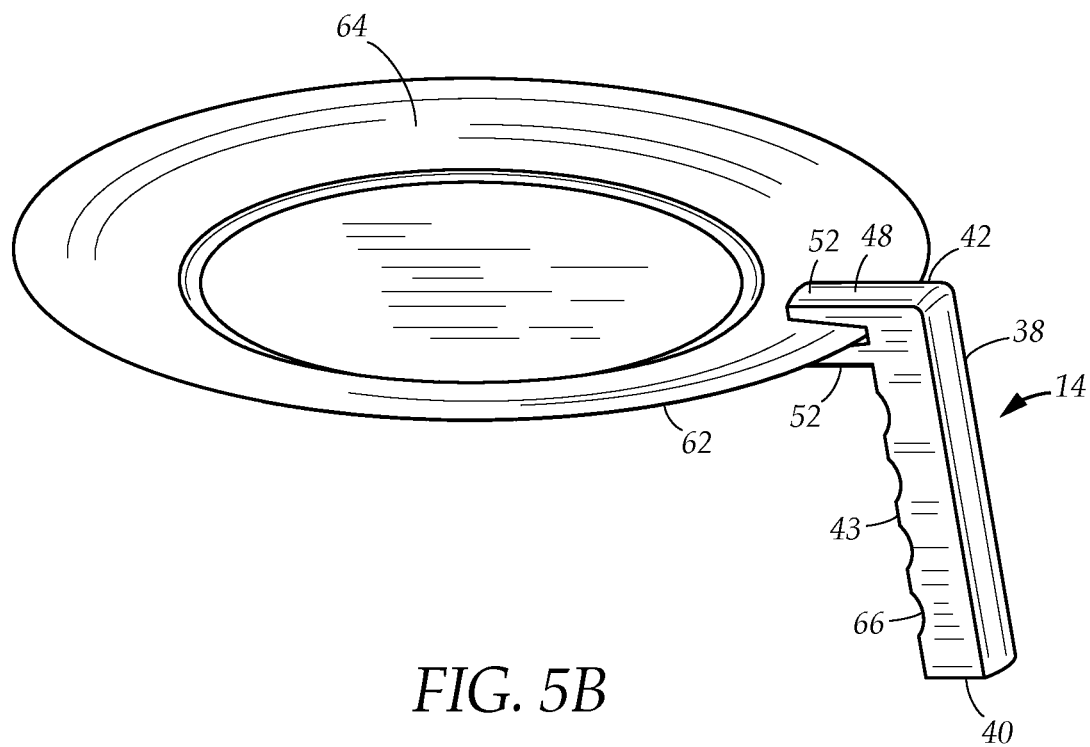
FIG. 5B is a perspective view of the handle of the sanitary utensil holding and serving system mounted onto a plate, illustrating another manner in which the arms of the mounting member of the handle engage or receive the edge of the plate therebetween to secure the handle on the plate according to one embodiment of the present disclosure.

Referring now to FIG. 2A, FIG. 5A, and FIG. 5B in conjunction with FIG. 2, the handle 14 includes a body 38 having a receiving end 40, a mounting end 42, an interior 44 having a longitudinal bore 46 configured to removably receive the connecting shaft 26 of one of the plurality of interchangeable serving utensils 12, a mounting member 48 protruding transversely outwardly from the mounting end 42, and a handgrip 43 that is adapted to be grasped by the user between the receiving end 40 and the mounting end 42.

The longitudinal bore 46 includes a longitudinal length extending from the receiving end 40 to the mounting end 42. The longitudinal bore 46 includes a first end 46A adjacent to the receiving end 40 and a second end 46B adjacent to the mounting end 42. The second end 46B includes a magnet 47 for removably engaging the magnetic material of the free second end 26B of the connecting shaft 26. The longitudinal bore 46 includes a width equal to or smaller than the width of the collar 22 such that when mounted onto the plurality of interchangeable serving utensils 12, the handle 14 does not slide past the collar 22 onto the standing portion 32. The connecting shaft 26 includes a width equal to or less than the width of the longitudinal bore 46. In embodiments, the longitudinal length of the connecting shaft 26 is substantially equal to the longitudinal length of the longitudinal bore 46. In some embodiments, the mounting member 48 is perpendicular relative the longitudinal bore 46.

The receiving end 40 includes an opening 50 for providing access to the longitudinal bore 46. The opening 50 extends into the interior 44 of the body 38 toward the mounting end 42 and is in communication with the longitudinal bore 46. In embodiments, the opening 50 tapers in width toward the mounting end 42 until it meets the longitudinal bore 46. In some embodiments, the smallest width of the opening 50 is equal to the width of the longitudinal bore 46.

The mounting member 48 includes a pair of arms 52 each having a free distal end 52D, a proximal end 52P attached to the mounting end 42, an outer surface 58, and an inner surface 60 tapering in width from the proximal end 52P to the free distal end 52D. The mounting member 48 is configured to engage and/or receive an edge 62 of a plate 64 between the pair of arms 52. In embodiments, the inner surfaces 60 of the pair of arms 52 comprise a tacky or grip-like surface, such as rubber, to facilitate engagement with the edge 62 of the plate 64.

In some embodiments, the handgrip 43 comprises ergonomic grooves 66 for receiving a user's fingers. The grooves 66 are oriented in the same direction as the pair of arms 52 of the mounting member 48 such that they are oriented toward the plate 64 when mounted thereon.

Figure 4B:
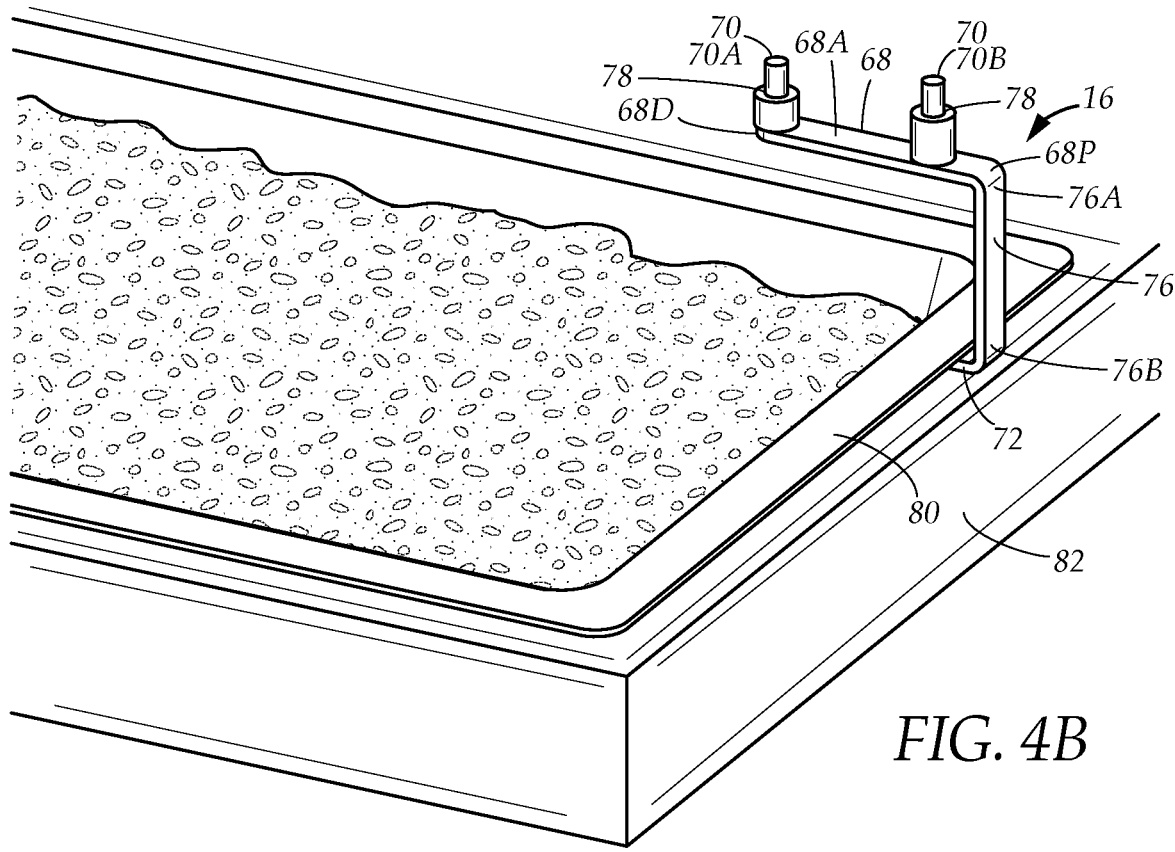
FIG. 4B is a perspective view of the stand of the sanitary utensil holding and serving system mounted onto a food tray holder in its food tray attachment configuration, illustrating the relative orientation of the utensil suspending portion and the pegs with respect to the food tray when mounted onto the food tray holder according to one embodiment of the present disclosure.
Figure 4C:
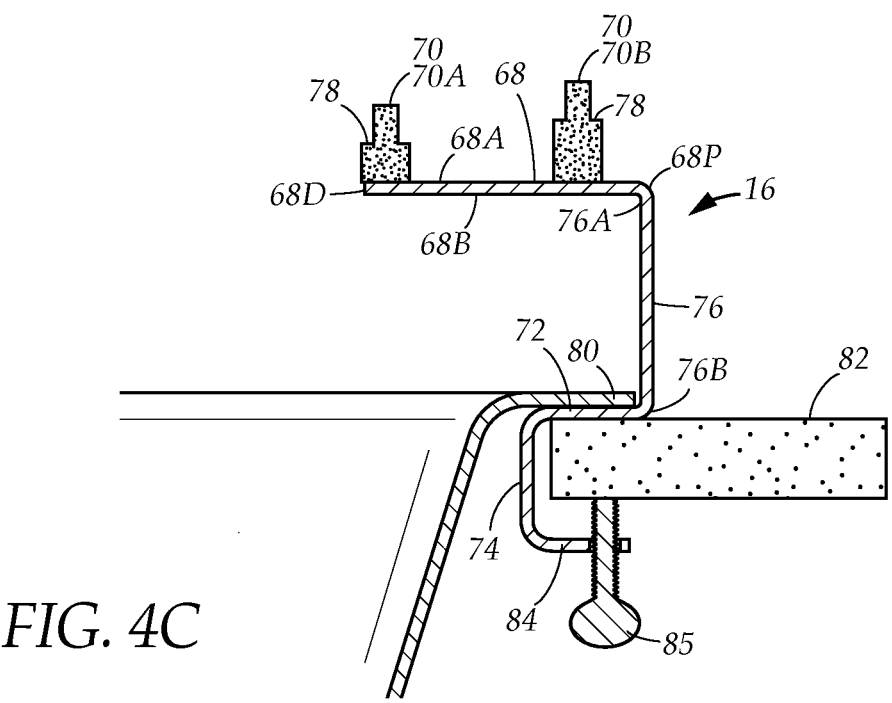
FIG. 4C is a cross-sectional view of the stand of the sanitary utensil holding and serving system mounted onto a food tray holder in its food tray attachment configuration, illustrating the relative orientation of the utensil suspending portion, the pegs, and the clamp with respect to the food tray holder when mounted thereon according to one embodiment of the present disclosure.

Referring back to FIG. 4A in conjunction with FIG. 4B and FIG. 4C, the stand 16 includes a utensil suspending portion 68 including a pair of pegs 70 extending upwardly therefrom for selectively engaging the pair of support apertures 36 of the standing portion 32 to receive and suspend the plurality of interchangeable serving utensils 12 thereon, a support portion 72 for stabilizing the stand 16 on a food tray, food tray holder, or table top, and an upright portion 76 extending between the utensil suspending portion 68 and the support portion 72 for creating a separating distance between the utensil suspending portion 68 and the support portion 72 that elevates the utensil suspending portion 68 above any surface on which the support portion 72 is mounted, e.g., a foot tray surface or table top surface.

The utensil suspending portion 68 includes a free distal end 68D a proximal end 68P, an upper surface 68A, a lower surface 68B. The pair of pegs 70 protrude upwardly from the upper surface 68A and include a first peg 70A disposed adjacent to the free distal end 68D of the utensil suspending portion 68 and a second peg 70B disposed adjacent to the proximal end 68P of the utensil suspending portion 68. The pair of pegs 70 are spaced longitudinally apart along the utensil supporting portion 68 and correspond in spacing to the pair of support apertures 36. In embodiments, the first peg 70A and the second peg 70B each include a shoulder 78 for receiving an edge of the pair of support apertures 36 for resting one of the plurality of interchangeable serving utensils 12 thereon. In some embodiments, the first peg 70A is smaller in height than the second peg 70B such that the shoulder 78 of the second peg 70B is elevated with respect to the shoulder 78 of the first peg 70A. In this way, when one of the plurality of interchangeable serving utensils 12 is mounted onto the utensil suspending portion 68 said utensil 12 is slanted for easier manipulation by a user.

The upright portion 76 includes a first end 76A connected to the proximal end 68P of the utensil suspending portion 68 and a second end 76B connected to the support portion 72.

The support portion 72 includes a food tray attachment mechanism 74 for securing the stand 16 in position to a food tray 80 or a food tray holder 82. The food tray attachment mechanism 74 includes a clamp 84 having a fastener 85 for fastening the support portion 72 to a surface of the food tray 80 or the food tray holder 82. The clamp 84 is connected to the second end 70B of the upright portion 76. In embodiments, the clamp 84 comprises a c-clamp.

Referring back to FIG. 2 in conjunction with FIG. 4A, the handle 14, in operation, is removable from the connecting shaft 26 of a first serving utensil of the plurality of interchangeable serving utensils 12, which is directed to a first tray of food, so that it may be used on a second serving utensil of the plurality of interchangeable serving utensils 12, which is directed to a second tray of food. To mount and suspend the first serving utensil onto the utensil suspending portion 68 of the stand 16, for example, when a user is finished self-serving a meal, the first serving utensil is lowered vertically onto the utensil suspending portion 68 such that the pair of pegs 70 engage the support apertures 36 of said serving utensil. To remove the handle 14 from the first serving utensil, the user simply pulls the handle 14 horizontally away from the connecting shaft 26 of the first serving utensil. The pair of pegs 70 maintain the first serving utensil in position on the utensil suspending portion 68 by preventing horizontal movement of the first serving utensil about the utensil suspending portion 68. In this way, the handle 14 may be removed while the first serving utensil remains suspended on the stand 16 over the food tray. To secure the handle 14 to the second serving utensil, the user simply slides the handle 14 horizontally onto the connecting shaft 26 of the second serving utensil via the longitudinal bore 46 of the handle 14 until the magnet 47 engages the second end 26B of the connecting shaft 26. Note, the second serving utensil would be suspended on a utensil suspending portion 68 of a stand 16 directed to a separate tray of food, thus the pair of pegs 70 would maintain the second serving utensil in position, thereby allowing the handle 14 to be attached to the second serving utensil while suspended on the utensil suspending portion 68. To use the second serving utensil, the user would simply lift the second serving utensil vertically upwardly from the utensil suspending portion 68 via the handle 14, thereby disengaging the pair of pegs 70 from the support apertures 36 and freeing the second serving utensil for use.

Figure 3:
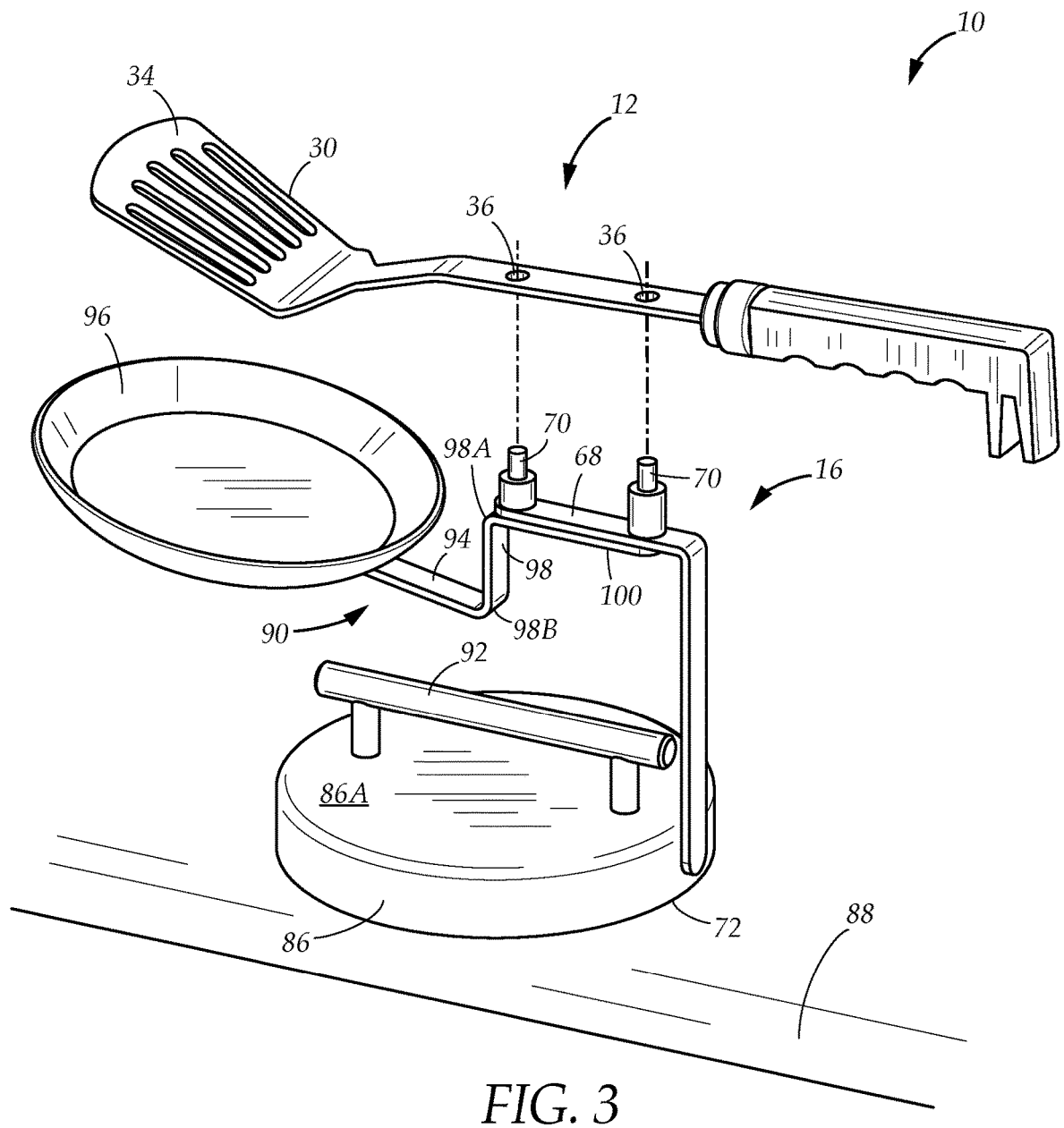
FIG. 3 is a perspective view of the stand of the sanitary utensil holding and serving system in its free-standing configuration, illustrating the base of the stand stabilizing the stand in a free-standing position on a surface and the pegs of the utensil suspending portion of the stand receiving a serving utensil to suspend said serving utensil on the stand above the food catching tray of the stand according to one embodiment of the present disclosure.

Referring now to FIG. 3, in embodiments, the support portion 72 of the sanitary utensil holding and serving system 10 includes a planar base 86 for stabilizing the stand 16 in a free-standing position on a surface 88, such as a tabletop surface, and an extension member 90 for attachment to the utensil suspending portion 68 to catch food or liquids falling from the plurality of interchangeable serving utensils 12. The planar base 86 comprises an upper surface 86A including a handle 92 protruding upwardly therefrom. In this way, the stand 16 may be carried and/or transported using the handle 92.

The extension member 90 includes a distal portion 94 having a food catching plate 96, a middle portion 98, and a proximal portion 100 including one or more apertures (not shown) for fastening the extension member 90 to the lower surface of the utensil suspending portion 68. In some embodiments, the extension member is z-shaped and the middle portion 98 is perpendicular relative to the distal portion 94 and the proximal portion 100. The middle portion 98 includes a first end 98A connected to the proximal portion 100 and a second end 98B connected to the distal portion 94. The distal portion 94 and the proximal portion 100 are non-coplanar with respect to each other such that the proximal portion 100 is elevated with respect to the distal portion 94 when the extension member 90 is attached to the utensil suspending portion 68. In operation, when the extension member 90 is attached to the utensil suspending portion 68 and one of the plurality of interchangeable serving utensils 12 is mounted onto the pair of pegs 70 of the utensil suspending portion 68 via the support apertures 36, the food catching plate 96 is oriented directly below the functional member 34 of the working portion 30 of said utensil 12 to catch any food that falls from the functional member while suspended on the stand 16.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a sanitary utensil holding and serving system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A sanitary utensil holding and serving system for use in buffet-style eating, in which users serve themselves their own meals from a shared array of food trays, comprising:
  a plurality of interchangeable serving utensils, each of the plurality of interchangeable serving utensils including a first end having a connecting shaft, a second end having a working portion, a standing portion connected to the working portion, and a collar between the standing portion and the connecting shaft, the connecting shaft including a longitudinal length, the working portion including a functional member for manipulating food, the standing portion having a top surface, a bottom surface, and a pair of support apertures spaced longitudinally on the standing portion and extending vertically between the top surface and the bottom surface;
  a handle including a body having a receiving end, a mounting end, an interior having a longitudinal bore extending from the receiving end toward the mounting end, and a mounting member protruding transversely outwardly from the mounting end, the longitudinal bore including a longitudinal length and configured to removably receive the connecting shaft of one of the serving utensils, the receiving end including an opening for providing access to the longitudinal bore, the mounting member including a pair of arms each having a distal end, a proximal end attached to the mounting end of the handle, an outer surface, and an inner surface tapering in width from the proximal end to the distal end, the mounting member configured to receive an edge of a plate between the arms; and
  a stand including a utensil suspending portion and a support portion, the utensil suspending portion including a pair of pegs extending upwardly for selectively engaging the pair of support apertures of one of the serving utensils to support said serving utensil upon the stand.

2. The sanitary utensil holding and serving system of claim 1, wherein the stand further includes an upright portion extending between the utensil suspending portion and the support portion, the upright portion including a first end connected to the utensil suspending portion and a second end connected to the support portion, the upright portion orthogonal relative to the utensil suspending portion.

3. The sanitary utensil holding and serving system of claim 2, wherein:
the utensil suspending portion includes a free distal end, a proximal end connected to the upright portion, an upper surface from which the pair of pegs protrude, and a lower surface; and
a first peg of the pair of pegs is disposed adjacent to the free distal end and a second peg of the pair of pegs is disposed adjacent to the proximal end, the pair of pegs spaced longitudinally along the utensil supporting portion and corresponding in spacing to the pair of support apertures.

4. The sanitary utensil holding and serving system of claim 3, wherein the first peg and the second peg each include a shoulder for receiving an edge of the pair of support apertures for resting one of the serving utensils thereon, the first peg smaller in height than the second peg such that the shoulder of the second peg is elevated with respect to the shoulder of the first peg.

5. The sanitary utensil holding and serving system of claim 3, wherein the connecting shaft includes a first end connected to the collar and a free second end including a magnetic material, the longitudinal length of the connecting shaft extending from the collar to the free second end.

6. The sanitary utensil holding and serving system of claim 5, wherein longitudinal bore includes a first end adjacent to the receiving end and a second end adjacent to the mounting end, the second end including a magnet for removably engaging the free second end of the connecting shaft.

7. The sanitary utensil holding and serving system of claim 6, further comprising an extension member for attachment to the utensil suspending portion, the extension member including a distal portion and a proximal portion, the distal portion including a food catching plate, the proximal portion including one or more apertures for fastening the extension member to the lower surface of the utensil suspending portion;
wherein when the extension member is attached to the utensil suspending portion and one of the serving utensils is mounted onto the utensil suspending portion, the food catching plate is oriented directly below the functional member of the working portion of said serving utensil to catch any food that falls from the functional member while suspending on the stand.

8. The sanitary utensil holding and serving system of claim 7, wherein:
the extension member is z-shaped and further includes a middle portion perpendicular relative to the distal portion and the proximal portion, the middle portion including a first end connected to the proximal portion and a second end connected to the distal portion;
the distal portion and proximal portion non-coplanar relative to each other such that the proximal portion is elevated relative to the distal portion when the extension member is attached to the utensil suspending portion.

9. The sanitary utensil holding and serving system of claim 7, wherein the support portion includes a planar base for stabilizing the stand in a free-standing position on a surface, the planar base including an upper surface having a handle protruding upwardly therefrom.

10. The sanitary utensil holding and serving system of claim 6, wherein the support portion includes a food tray attachment mechanism for securing the stand in position to a food tray or a food tray holder, the food tray attachment mechanism including a clamp for fastening the support portion to a surface of the food tray or the food tray holder, the clamp connected to the second end of the upright portion.

11. The sanitary utensil holding and serving system of claim 10, wherein the clamp comprises a c-clamp.

12. The sanitary utensil holding and serving system of claim 6, wherein the body of the handle further comprises a handgrip that is adapted to be grasped by the user between the receiving end and the mounting end.

13. The sanitary utensil holding and serving system of claim 12, wherein the handgrip comprises ergonomic grooves for receiving a user's fingers, the grooves oriented in the direction of the pair of arms of the mounting member.

14. The sanitary utensil holding and serving system of claim 6, wherein:
the opening of the receiving end extends into the interior of the body of the handle toward the mounting end;
the opening is in communication with the longitudinal bore; and
the opening tapers in width toward the mounting end until it meets the longitudinal bore, a smallest width of the opening equal to a width of the longitudinal bore.

15. The sanitary utensil holding and serving system of claim 14, wherein the connecting shaft includes a width equal to or less than the width of the longitudinal bore.

16. The sanitary utensil holding and serving system of claim 15, wherein a cross-section of the connecting shaft is rectangular in shape and uniform along the longitudinal length of the connecting shaft.

17. The sanitary utensil holding and serving system of claim 16, wherein the longitudinal length of the connecting shaft is substantially equal to the longitudinal length of the longitudinal bore.

18. The sanitary utensil holding and serving system of claim 17, wherein the collar includes a width that is equal to or greater than a width of the longitudinal bore of the handle.

19. The sanitary utensil holding and serving system of claim 18, wherein the mounting member is perpendicular relative to the longitudinal bore.

* * * * *